(12) United States Patent
Reeves et al.

(10) Patent No.: US 8,571,534 B1
(45) Date of Patent: Oct. 29, 2013

(54) SYSTEMS AND METHODS OF FILTERING AN AUDIO SPEECH STREAM

(75) Inventors: Raymond E. Reeves, Olathe, KS (US); Simon Youngs, Overland Park, KS (US); Gary D. Koller, Overland Park, KS (US); Piyush Jethwa, Overland Park, KS (US); Mark D. Peden, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 416 days.

(21) Appl. No.: 12/880,944

(22) Filed: Sep. 13, 2010

(51) Int. Cl.
*H04M 3/00* (2006.01)
*G10L 15/04* (2013.01)

(52) U.S. Cl.
USPC .......................... 455/418; 455/419; 704/251

(58) Field of Classification Search
USPC .............. 455/418, 419; 704/251, 254; 725/25
See application file for complete search history.

(56) References Cited

U.S. PATENT DOCUMENTS

| | | | |
|---|---|---|---|
| 5,832,212 A * | 11/1998 | Cragun et al. | 726/2 |
| 7,133,837 B1 | 11/2006 | Barnes, Jr. | |
| 7,437,290 B2 | 10/2008 | Danieli | |
| 2005/0254483 A1 | 11/2005 | Factor et al. | |
| 2006/0095262 A1* | 5/2006 | Danieli | 704/251 |
| 2008/0184284 A1 | 7/2008 | O'Hern | |
| 2008/0221882 A1 | 9/2008 | Bundock et al. | |
| 2010/0017818 A1* | 1/2010 | Joshi et al. | 725/32 |
| 2011/0019533 A1* | 1/2011 | Freimuth et al. | 370/217 |

* cited by examiner

*Primary Examiner* — Vladimir Magloire
*Assistant Examiner* — Edd Rianne Plata (57) ABSTRACT

A system for processing an audio speech stream during a wireless dispatch communication session obtains processing criteria from an originating wireless device and defines a filter according to the obtained processing criteria. The system receives an audio speech stream at a dispatch serving node and generates one or more filtered audio streams with the filter, and sends the one or more filtered audio streams to a receiving wireless device.

19 Claims, 6 Drawing Sheets

SYSTEMS AND METHODS OF FILTERING AN AUDIO SPEECH STREAM

TECHNICAL BACKGROUND

Wireless voice communication is typically provided as interconnect voice communication or dispatch voice communication. Interconnect voice communication is typically full duplex, for example, "cellular" communications and circuit-switched communications. Dispatch voice communications is typically half-duplex, for example, push-to-talk and "walkie-talkie" communications.

In dispatch voice communication systems, a first party is granted a floor and is able to transmit while at least one other party receives the transmission from the first party. Dispatch voice communication systems can also include mechanisms for a participant to request the floor and to become the transmitting party when the floor is granted to them, as well as mechanisms for participants to request the preemption of a transmitting participant and to revoke the floor from a transmitting participant.

Often parties to a dispatch communication session use devices with a loudspeaker, which can produce sounds audible to other people near the receiving party. The receiving device may receive and produce an audio communication with little or no warning to the user. Since the participants in the dispatch communication session are usually geographically dispersed, the receiving party may be in any number of settings, such as an office, a theater, a meeting, a school, or a church or other religious setting, unbeknownst to the transmitting party. In such a case, a transmitting party may make comments or use language which is inappropriate for the setting of the receiving party, and which would then be audibly broadcast by the receiving device with little or no warning to the receiving party.

OVERVIEW

In one embodiment, a system and method for processing an audio speech stream during a wireless dispatch communication session is provided that obtains processing criteria from an originating wireless device and defines a filter according to the obtained processing criteria. The system receives an audio speech stream at a dispatch serving node and generates one or more filtered audio streams with the filter, and sends the one or more filtered audio streams to a receiving wireless device.

DETAILED DESCRIPTION

In an embodiment, a wireless communication system processes an audio speech stream during a wireless dispatch communication session. The wireless communication system defines a filter for processing the audio speech stream according to processing criteria which the system receives from a wireless device or a network device. The wireless communication system receives the audio speech stream from a wireless device, processes the audio speech stream using the defined filter, and generates one or more filtered audio streams. The wireless communication system can send the one or more filtered audio streams to one or more receiving wireless devices.

Figure 1:
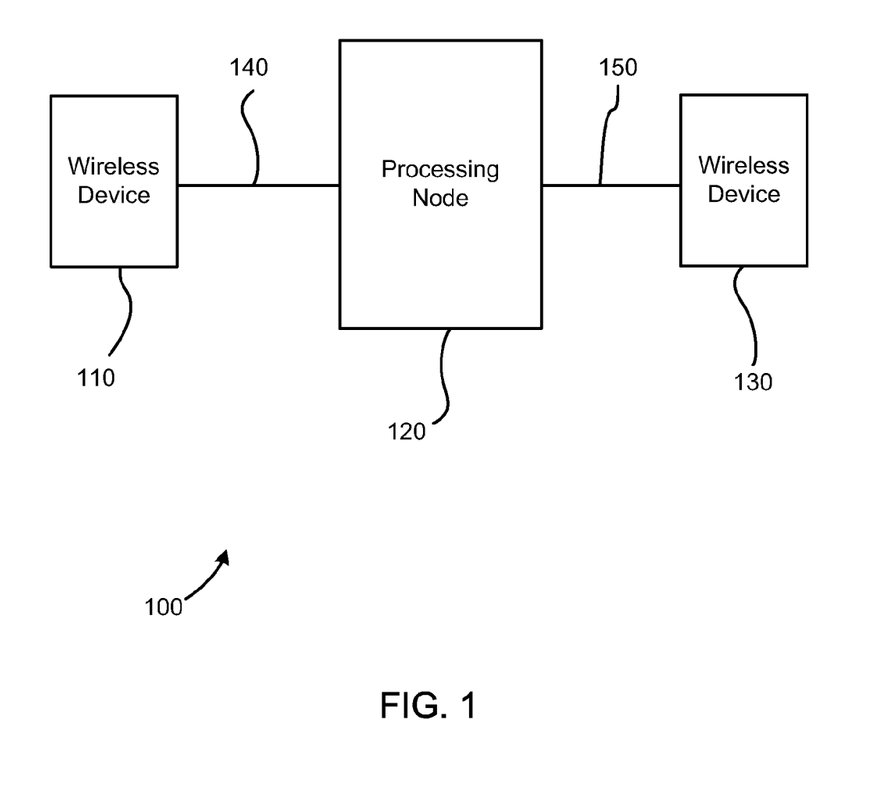
FIG. 1 illustrates an exemplary communication system to process an audio speech stream.

FIG. 1 illustrates an exemplary communication system 100 to process an audio speech stream during a wireless dispatch communication session. Communication system 100 comprises originating wireless device 110, processing node 120, and receiving wireless device 130. Other network elements may be present in the communication system 100 to facilitate wireless communication but are omitted for clarity, such as base stations, base station controllers, gateways, mobile switching centers, dispatch application processors, and location registers such as a home location register or visitor location register. Examples of a wireless device 110 and 120 can include a telephone, a computer, a personal digital assistant, an internet access device, or other device capable of wireless communication, including combinations thereof. Processing node 120 can be any network element capable of receiving and processing the audio speech stream in a wireless dispatch communication. One example of processing node 120 is a dispatch application server. Other network elements may be similarly used as processing node 120.

The originating wireless device 110 and the receiving wireless device 130 can communicate with processing node 120 over wireless communication links 140 and 150. Wireless communication links 140 and 150 can be a radio frequency, microwave, infrared, or other similar physical signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE). Other wireless protocols can also be used.

Processing node 120 can obtain processing criteria and an audio speech stream from originating wireless device 110 over communication link 140. Processing criteria can also be obtained from the wireless receiving device 130. Processing node 120 can define a filter using the processing criteria, and can process the audio speech stream with the filter to generate a filtered audio stream. The use of processing criteria to define a filter is further described below. Processing node 120 can send the filtered audio stream to a receiving wireless device, such as receiving wireless device 130, using wireless communication link 150.

Figure 2:
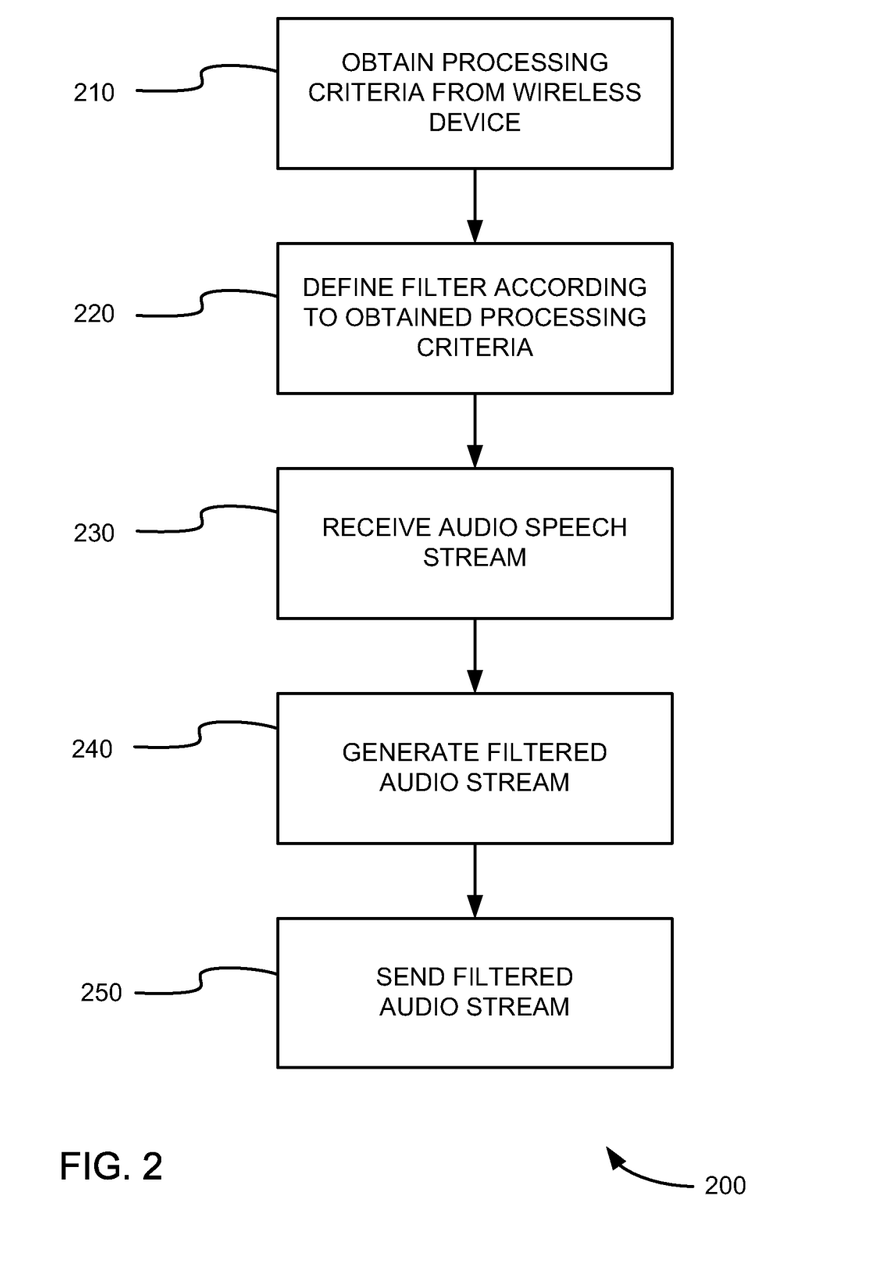
FIG. 2 illustrates an exemplary method of processing an audio speech stream during a wireless dispatch communication session.

Referring to FIG. 2, in a method of processing an audio speech stream during a wireless dispatch communication session 200, processing criteria is obtained from a wireless device in operation 210. The wireless device can be originating wireless device 110 or receiving wireless device 130. Processing criteria can also be obtained from a network device, such as processing node 120. In operation 220, according to the obtained processing criteria, a filter is defined to process an audio speech stream. An audio speech stream is received in operation 230. The audio speech stream is received from the originating wireless device 110 at a communication interface of processing node 120. The audio speech stream is stored in a storage associated with processing node 120.

In step 240, the filter is used to process the received audio speech stream to generate a filtered audio stream. The filtered audio stream can be processed according to different processing criteria. The filtered audio stream can then be sent, in operation 250. For example, the filtered audio stream can be provided to a communication interface of the processing node 120, and can be sent by the communication interface to receiving wireless device 130.

In operation, processing criteria can be used to define a filter for processing a received audio speech stream. Processing criteria can include network parameters and user parameters. The network parameters can include a location of a wireless device, for example whether the receiving wireless device is in a movie theater or in a school. The location of the wireless device can be determined, for example, by Global Positioning Satellite system, or based on the location of a nearby base station, or it can be indicated by a user of the wireless device. A user of a wireless device may also be a subscriber to location-based services offered by a wireless communication service provider. Other methods of determining the location of a wireless device will be apparent. Network parameters can also include time information, such as a discrete time or a time period, and calendar information, such as a day or days, or a range of dates. Network parameters can also include an indication that a particular wireless device is participating in a wireless communication session, and can also include presence information of a wireless device. Network parameters can be considered separately or in combination. For example, a combination of network parameters could be "Sunday, from 8:00 AM to 12:00 PM, at church." Other combinations of network parameters are possible.

User parameters can include identifiers of particular receiving wireless devices. User parameters can also include an indication of whether to process an audio speech stream, a level of processing representing a degree to which an audio speech stream is to be processed, and whether to send a filtered or unfiltered (that is, processed or unprocessed) audio stream to a specified receiving wireless devices.

User parameters can also include words or phrases which a user desires to identify and to remove from or render inaudible in an audio speech stream. For example, a user can create and manage a catalog of words and phrases that the user desires to remove or render inaudible from an audio speech stream. The catalog may be in the form of a text list of words and phrases, or it may be an audio list of words or phrases. The processing node 120 can store and use the catalog to define a filter for processing the audio speech stream. Processing the audio speech stream can thus include detecting a specified word or phrase, and rendering the detected word or phrase inaudible, or replacing the detected word or phrase with a replacement word or phrase. The replacement word or phrase can also be specified in the catalog. In an embodiment, processing node 120 can convert a received audio speech stream to text, and can compare the converted text to a list containing the catalog of utterances to be filtered from the audio speech stream to detect specified words or phrases. In another embodiment, processing node 120 can analyze the audio speech stream and detect words or phrases specified in the catalog. Processing node 120 can then replace the detected words or phrases with replacement words or phrases, or it can render the detected words or phrases inaudible by removing them from the audio speech stream, or by setting an output volume to zero briefly, or by covering the word or phrase with a noise such as a bleep. Other methods of detecting specified words or phrases in the audio speech stream will be apparent.

A level of processing can also be specified as a user parameter. A level of processing can be associated with a catalog of words and phrases, and different levels of processing can be associated with different catalogs. For example, a high level of processing can be associated with a large or comprehensive catalog of words and phrases to be detected and rendered inaudible. A medium level of processing can be associated with a catalog which is less inclusive than a catalog associated with a high level of processing, and a low level of processing can be associated with a catalog which has relatively few words or phrases compared to a catalog associated with medium or high level processing. The levels of high, medium and low processing can be determined by a user, or they can be specified by a network device.

However, a level of processing is not necessarily associated with a catalog of words and phrases, and can be one processing criterion used to define a filter. For example, if a user specifies a high level of processing, the defined filter may be applied in more locations, at more times, and/or with a larger number of wireless devices, whereas if a low level of processing is specified, the defined filter may be applied in fewer locations, at fewer times, and/or with fewer wireless devices.

The terms high, medium and low as used herein are merely exemplary and are not intended to be limiting in any way. Varying levels of processing can be given any type of label to indicate the level of processing, including different names, numbers, letters, punctuation characters, and colors. Other types of labels will also be apparent.

User parameters can be considered separately or in combination. For example a combination of user parameters could be "apply a high level of processing to all calls made to my mother's wireless device." Other combinations of user parameters are possible. User parameters can be specified by the user of the originating wireless device, or by a user of a receiving wireless device. User parameters can also be provided by another network device.

Network parameters and user parameters of the processing criteria can be used separately or in combination to determine a filter which is used to process an audio speech stream under any number of conditions or circumstances. For example, based on the processing criteria, a filter can be defined such that all audio speech streams sent from the originating wireless device on each Sunday between 8 AM and 12 PM are processed. Another exemplary filter can be defined such that all audio streams sent to a specified receiving wireless device are always processed; thus, for example, all audio streams sent to the receiving wireless device of a user's mother can always be processed.

In another exemplary filter, an audio speech stream is processed when a specified receiving wireless device is in a specified location. For example, if a receiving wireless device is located at a school, an audio speech stream sent to that receiving wireless device will be processed.

Processing criteria can also be used to determine whether to process the audio speech stream, and to what degree. In an embodiment, a level of processing can be determined based on the location of the receiving wireless device. For example, if the receiving wireless device is determined to be at a school, a high level of processing may be applied, whereas if the receiving wireless device is determined to be at an office, a medium or low level of processing may be applied. Other locations, such as a user's home, may be associated with no level of processing. According to processing criteria, an unprocessed or "raw" audio speech stream can also be sent to a specified receiving wireless device, or at a specified time or date.

The processing criteria can be provided by the originating wireless device, or by the receiving wireless device. For example, a user of a receiving wireless device may specify that all audio speech streams received in a wireless dispatch session are to be processed. A user of a receiving wireless device may also indicate that all calls from a particular wireless device (such as that of a particularly profane friend) are always processed. A user of a receiving wireless device can also specify that calls received when the receiving wireless device is in a specified location are filtered, such as when a receiving device is at work or at school. A user of a receiving wireless device can also specify dates and times when received calls are to be processed. Similarly, the other various processing criteria described above can be provided by a receiving wireless device, and can be used in various combinations to define a filter for processing an audio speech stream.

If processing criteria are received from both the originating and the receiving wireless devices, the processing node 120 can define a filter by resolving potential conflicts among processing criteria. For example, an originating wireless device may provide processing criteria specifying that an unprocessed audio speech stream should always be sent to a friend's wireless device. However, the friend's wireless device can specify that all currently-received audio speech streams are to be processed, because the receiving wireless device is at school. In this case, the processing node 120 can define a filter which is used to process the audio speech stream despite the processing criteria from the originating wireless device. A level of processing can also be used to resolve potential conflicts among processing criteria. For example, if an originating wireless device specifies a high level of processing in all outgoing calls, even if a receiving wireless device specifies that calls which it receives are not to be processed, a high level of processing may nonetheless be applied to the call from the originating wireless device. Other resolutions of potential conflicts based on location, date, time, user preferences, and other criteria are also possible.

Processing criteria can also be provided from a network device. For example, a user of an originating or receiving wireless device may provide processing criteria which can be stored in a network device, such as in a storage element of processing node 120. The processing criteria may be stored as part of a user profile, or they can be stored separately, such as in a network-accessible storage for users' processing criteria. Processing criteria may be provided to the processing node 120 using a wireless device, or they may be provided to the processing node 120 using a user interface.

The processing node 120 can also increase or reduce the amount of processing of an audio stream, or it can limit the number of filtered audio streams generated, in response to network load conditions. For example, if a network is congested, processing node 120 may limit the number of filtered audio streams generated. The processing node 120 may also use information about the network load conditions to define the filter. For example, if the network is congested, the processing node 120 define the filter to reduce the amount of processing applied to an audio speech stream, or it may define the filter to reduce the amount of data present in the filtered audio stream, responsive to the network congestion information. In such case, the processing node 120 may provide a notification message to the originating wireless device and to the receiving wireless device that the number of filtered audio streams is being limited, or that the processing service is unavailable due to the network congestion. Thus, the processing node 120 can respond to network load conditions and modify the processing of audio speech streams accordingly.

Figure 3:
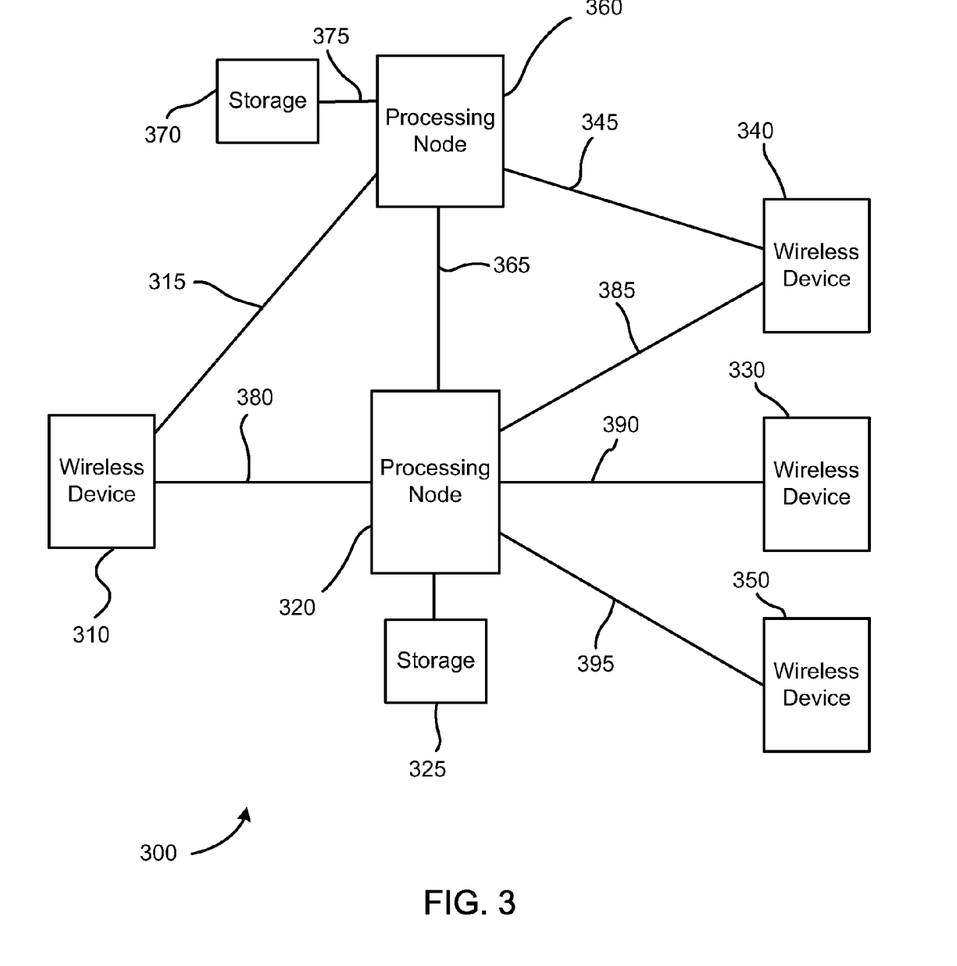
FIG. 3 illustrates another exemplary communication system to process an audio speech stream.

FIG. 3 illustrates an exemplary communication system 300 to process an audio speech stream during a wireless dispatch communication session. Communication system 300 comprises originating wireless device 310, a first processing node 320, a first storage device 325, a second processing node 360, a second storage device 370, and receiving wireless devices 330-350. Other network elements may be present in the communication system 300 to facilitate wireless communication but are omitted for clarity. Examples of wireless devices 310, 340, 350 and 360 include a telephone, a computer, a personal digital assistant, an internet access device, or other device capable of wireless communication, including combinations thereof. Processing nodes 320 and 360 can be any network element capable of receiving and processing the audio speech stream in a wireless dispatch communication.

In an embodiment, the first processing node 320 receives an audio speech stream from originating wireless device 310 and sends filtered audio streams to receiving wireless devices 330-350, and the second processing node 360 defines at least one filter according to processing criteria and processes the audio speech stream. Processing nodes 320 and 360 may be similar to processing nodes 500 and 600 illustrated in FIGS. 5 and 6. Storage devices 325 and 370 can comprise a disk drive, flash drive, memory circuitry, or some other memory device. Storage devices 325 and 370 can be in communication with processing nodes 320 and 360, and can be integrated with the processing nodes 320 and 360, or they can be independent network devices.

First processing node 320 can receive an audio speech stream from originating wireless device 310 over wireless link 380 and can store the audio speech stream in storage 325. Second processing node 360 can obtain processing criteria from wireless devices 310, 330, 340 and 350 over a wireless link, such as wireless link 315 or 345. Processing criteria can be stored in storage 370. Using the processing criteria, the second processing node 360 can define at least one filter, and can process the audio speech stream with the at least one filter to generate one or more filtered audio streams. The second processing node 360 can send the one or more filtered audio streams to the first processing node 320, and the first processing node 320 can store the one or more filtered audio streams in storage 325 and can send the one or more filtered audio streams to receiving wireless devices 340-360 using wireless communication links 385-395.

Figure 4:
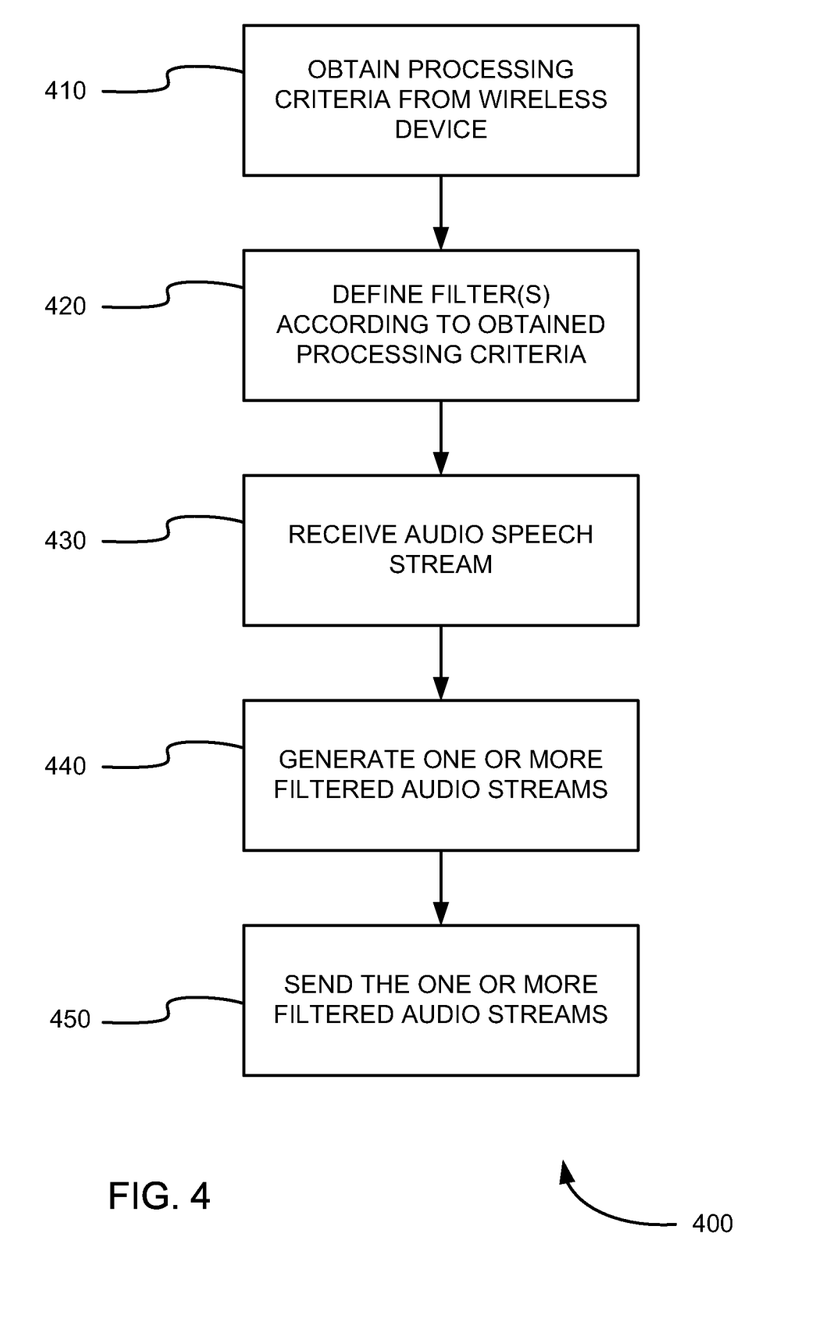
FIG. 4 illustrates another exemplary method of processing an audio speech stream during a wireless dispatch communication session.

Referring to FIG. 4, in a method of processing an audio speech stream during a wireless dispatch communication session 400, processing criteria is obtained from a wireless device in operation 410. The wireless device can be originating wireless device 310 or a receiving wireless device 330-350. Processing criteria can also be obtained from a network device, such as the second processing node 360. In operation 420, according to the obtained processing criteria one or more filters are defined to process an audio speech stream. An audio speech stream is received in operation 430. The audio speech stream can be received from the originating wireless device 310 at a communication interface of processing node 500. The audio speech stream can be stored in a storage element of processing node 500.

In operation 440, the filter is used to process the received audio speech stream to generate one or more filtered audio streams. The one or more filtered audio speech streams is processed according to different processing criteria, as described above. The one or more filtered audio streams is then sent, in operation 450. For example, the filtered audio streams can be provided to the communication interface 520 of the processing node 500, and can be sent by the communication interface 520 to one or more receiving wireless devices 330-350.

Processing criteria can be used to define a filter for processing the received audio speech stream in a manner similar to that described above with respect to the exemplary communication system 100 illustrated in FIG. 1. That is, network parameters and user parameters of the processing criteria can be used separately or in combination to determine at least one filter which is used to process an audio speech stream under any number of conditions or circumstances. Processing criteria can also be used to determine whether to process the audio speech stream, and to what degree.

Filters may be defined and applied in a communication session having multiple participants. For example, a filter can be defined such that all audio speech streams sent in a wireless communication session having more than a threshold number of participants can always be processed. In addition, filters can be defined so that different filtered audio streams are sent to specified receiving wireless devices. For example, in a wireless communication session with multiple participants, a first filtered audio stream with a high level of processing can be sent to a first recipient, a second filtered audio stream with a medium level of processing can be sent to a second recipient, and a third filtered audio stream with a low level of processing can be sent to a third recipient. The degree of processing can be specified by the user of the originating wireless device, the user of a receiving wireless device, or a network device. Some or all of the audio streams can also be raw (that is, unprocessed) audio streams. Any number of participants can partake in the wireless communication session, and the level of processing of the audio speech stream sent to each receiving wireless device can be determined on a device-by-device basis, according to processing criteria. For example, a filter can be defined for some or all of the participants based on whether a particular receiving wireless device is determined to be participating in a wireless communication session. Also, filters for each receiving wireless device may be defined based on, for example, an identifier of each receiving wireless device, or based on the location of each receiving wireless device, or based on the local time of day (or date) of each receiving wireless device (for example, in a case where participants are in different time zones). A filter can also be applied at any time, and at any level of filtering, as indicated by a user.

The processing criteria can be provided by the originating wireless device, or by one or more receiving wireless devices. For example, a user of a receiving wireless device may specify that all audio speech streams received in a wireless dispatch session are to be processed. A user of a receiving wireless device may also indicate that all calls from a particular wireless device are always processed. A user of a receiving wireless device can also specify that calls received when the receiving wireless device is in a specified location are filtered, such as when a receiving device is at work or at school. A user of a receiving wireless device can also specify dates and times when received calls are to be processed. Similarly, other various processing criteria described above can be provided by a receiving wireless device, and can be used in various combinations to define filters to generate individualized filtered audio streams for each participant in a dispatch communication session.

Processing criteria can also be provided from a network device. For example, a user of an originating or receiving wireless device may provide processing criteria which can be stored in a network device, such as in storage 370. The processing criteria may be stored as part of a user profile, or they can be stored separately, such as in a network-accessible storage for users' processing criteria. Processing criteria may be provided using a wireless device, or it may be provided to the processing node 360. Accordingly, users of the communication system 300 can define a filter or filters for use in any number of conditions to a generate filtered audio stream.

Figure 5:
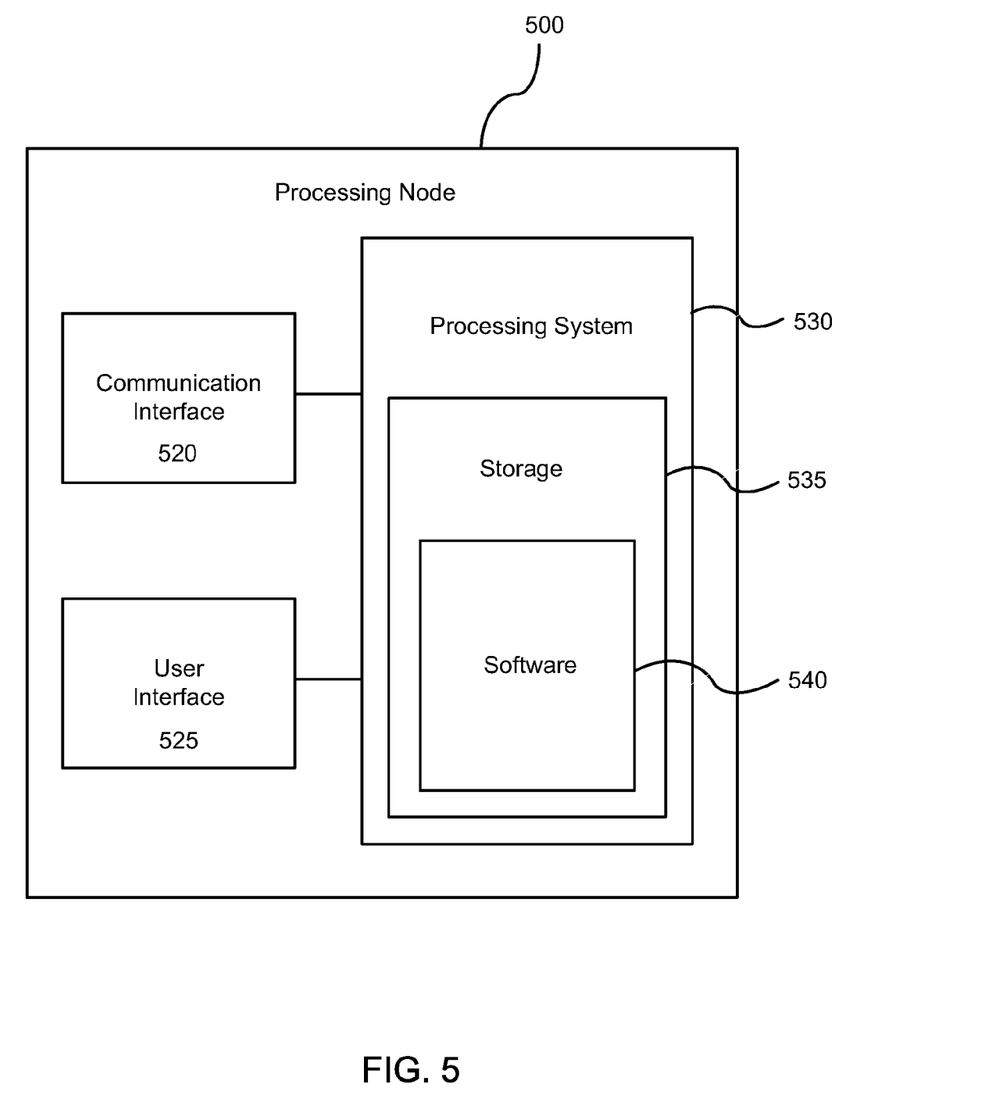
FIG. 5 is a block diagram that illustrates an exemplary processing node.
Figure 6:
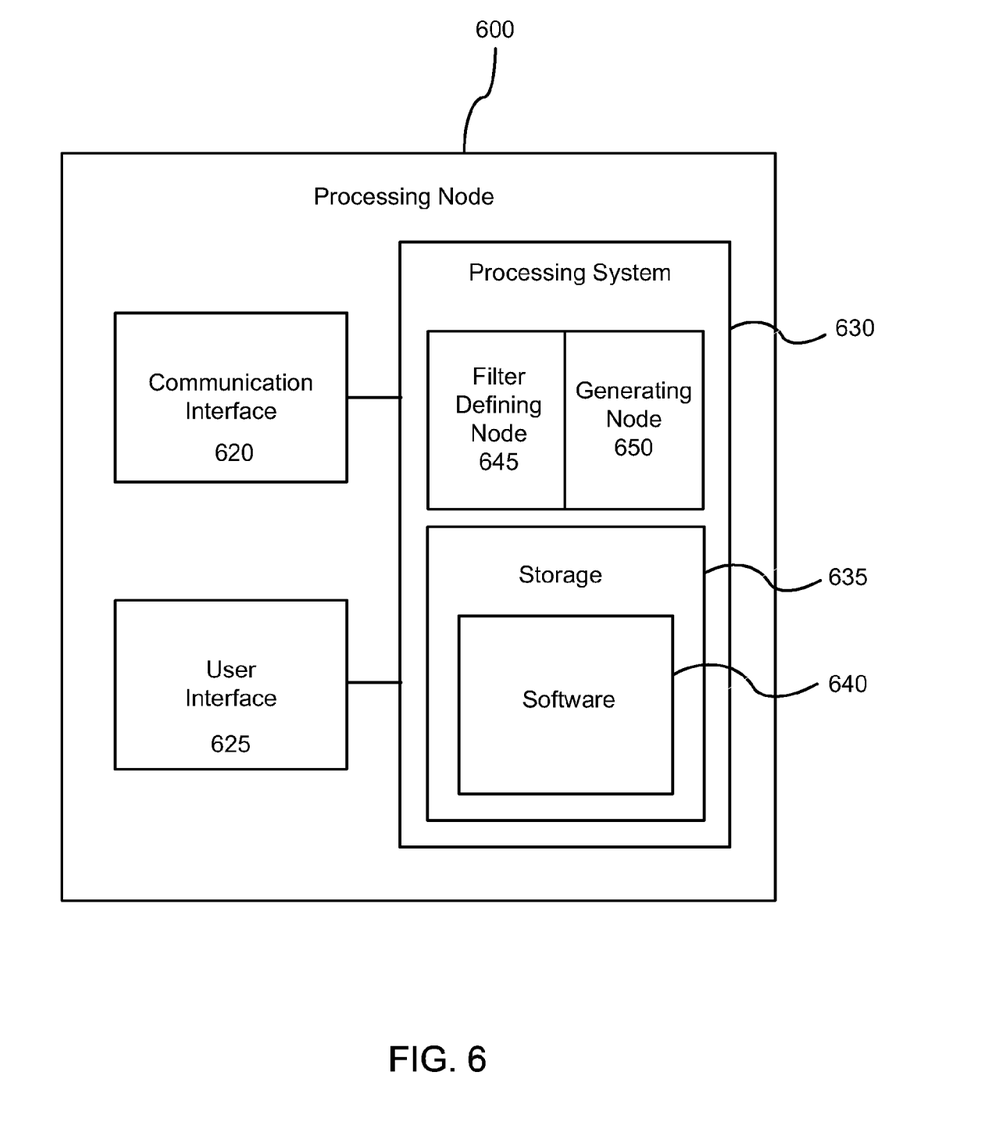
FIG. 6 is a block diagram that illustrates another exemplary processing node.

FIGS. 5 and 6 illustrate exemplary processing nodes 500 and 600. Processing node 500 can include a communication interface 520 and a user interface 525, each in communication with a processing system 530. Processing node 500 can receive processing criteria and an audio speech stream with communication interface 520 and can communicate the processing criteria and the audio speech stream to the processing system 530. Processing system 530 can define a filter using the processing criteria and can process the audio speech stream to generate a filtered audio stream. Processing system 530 can include a storage unit 535. Storage unit 535 comprises a disk drive, flash drive, memory circuitry, or other memory device. Storage unit 535 can store software 540 which is used in the operation of the processing node 500. Software 540 may include an operating system, utilities, drivers, network interfaces, applications, or some other type of software. Storage unit 535 can also store the processing criteria, the filter, the received audio speech stream, and the filtered audio stream. Processing system 530 can communicate the filtered audio stream to communication interface 520, and communication interface 520 can send the filtered audio stream, for example, to receiving wireless device 130. Processing node 500 can also include a user interface 525 to permit a user to configure and control the operation of the processing node 500.

With respect to FIG. 6, processing node 600 includes elements similar to processing node 500, and also includes a filter defining node 645 and a generating node 650. Filter defining node 645 generates a filter according to processing criteria received by processing node 600. Generating node 650 generates a filtered audio stream with the filter. The processing criteria, the filter, the audio speech stream, and the filtered audio stream can be stored in storage 635. The communication interface 620 can receive the audio speech stream and can also send the filtered audio stream.

The above description and associated figures teach the best mode of the invention. The following claims specify the scope of the invention. Note that some aspects of the best mode may not fall within the scope of the invention as specified by the claims. Those skilled in the art will appreciate that the features described above can be changed or combined in various ways to form multiple variations of the invention. As a result, the invention is not limited to the specific embodiments described above, but only by the following claims and their equivalents.

What is claimed is:

1. A method of processing an audio speech stream during a wireless dispatch communication session, the method comprising:
    obtaining processing criteria from an originating wireless device, the processing criteria comprising at least one of a location of the originating wireless device, time information indicating a time of day when the audio speech stream will be processed, and calendar information indicating a date when the audio speech stream will be processed;
    defining a filter according to the obtained processing criteria;
    receiving the audio speech stream at a dispatch serving node;
    generating one or more filtered audio streams with the filter; and
    sending the one or more filtered audio streams to a receiving wireless device.

2. The method of claim 1 further comprising
    obtaining processing criteria from the receiving wireless device.

3. The method of claim 1 further comprising
obtaining processing criteria from a network device.

4. The method of claim 1, wherein the processing criteria comprises at least one of network parameters and user parameters, wherein the network parameters comprises at least one of location information of the originating wireless device, time information indicating a time of day when the audio speech stream will be processed, and calendar information indicating a date when the audio speech stream will be processed.

5. The method of claim 1, wherein the filter is defined for a group of receiving wireless devices.

6. The method of claim 5, wherein a first filter is defined for a first receiving wireless device and a second filter is defined for a second receiving wireless device among the group of receiving wireless devices.

7. The method of claim 1, wherein obtaining the processing criteria further comprises obtaining a first processing criteria and a second processing criteria from at least two of the originating wireless device, the receiving wireless device and the network device.

8. The method of claim 7, wherein defining the filter further comprises selecting the first processing criteria based upon the first processing criteria meeting a filter criteria.

9. The method of claim 1 further comprising
limiting a quantity of the one or more filtered audio streams based upon a network load.

10. The method of claim 1, wherein the filter is defined according to a network load.

11. A wireless communication system for processing an audio speech stream during a wireless dispatch communication session, comprising:
a processing node configured for:
obtaining processing criteria from an originating wireless device, the processing criteria comprising at least one of a location of the originating wireless device, time information indicating a time of day when the audio speech stream will be processed, and calendar information indicating a date when the audio speech stream will be processed;
defining a filter according to the obtained processing criteria;
receiving the audio speech stream;
generating one or more filtered audio streams with the filter; and
sending the one or more filtered audio streams to a receiving wireless device.

12. The system of claim 11, wherein the processing node further obtains processing criteria from the receiving wireless device.

13. The system of claim 11, wherein the processing node further obtains processing criteria from a network device.

14. The system of claim 11, wherein the processing criteria comprises at least one of network parameters and user parameters, wherein the network parameters comprises at least one of location information of the originating wireless device, time information indicating a time of day when the audio speech stream will be processed, and calendar information indicating a date when the audio speech stream will be processed.

15. The method of claim 11, wherein the filter is defined for a group of receiving wireless devices.

16. The method of claim 15, wherein a first filter is defined for a first receiving wireless device and a second filter is defined for a second receiving wireless device among the group of receiving wireless devices.

17. The method of claim 11, wherein the processing criteria is obtained from at least two of the originating wireless device, the receiving wireless device, and the network device, and wherein the filter is defined according to the processing criteria obtained from one device regardless of other processing criteria obtained.

18. The method of claim 11, wherein a number of the one or more filtered audio streams generated is limited according to a network load.

19. The method of claim 11, wherein the filter is defined according to a network load.

* * * * *